United States Patent [19]

Weil et al.

[11] 4,395,614

[45] Jul. 26, 1983

[54] APPARATUS TO SUPPRESS OXIDATION DURING RESISTANCE WELDING

[75] Inventors: Wolfgang Weil, Heitersheim, Fed. Rep. of Germany; Andres Lanz, Mutschellen, Switzerland; Max Vogt, Singapore, Singapore; Paul Meier, Widen, Switzerland; Martin Kaul, Bellikon, Switzerland; Hanspeter Fankhauser, Irvington, N.Y.

[73] Assignee: Paul Opprecht, Bergdietikon, Switzerland

[21] Appl. No.: 212,593

[22] Filed: Dec. 3, 1980

[30] Foreign Application Priority Data

Dec. 19, 1979 [CH] Switzerland ............... 11286/79

[51] Int. Cl.$^3$ ............................................. B23K 35/38
[52] U.S. Cl. ..................................... 219/72; 219/64; 219/81
[58] Field of Search .................. 219/81, 82, 72, 74, 219/64

[56] References Cited

U.S. PATENT DOCUMENTS

| | | | |
|---|---|---|---|
| 2,905,805 | 9/1959 | McElrath | 219/74 X |
| 3,495,066 | 2/1970 | Bruyard | 219/74 |
| 3,588,424 | 6/1971 | Hammer | 219/74 X |
| 3,652,818 | 3/1972 | Erlandson | 219/74 X |

Primary Examiner—Elliot A. Goldberg
Attorney, Agent, or Firm—Ernest F. Marmorek

[57] ABSTRACT

In an apparatus and a method of at least partially suppressing oxidation of can components or the like during resistance roller welding with the aid of an inert gas, the steps include welding the can components to one another, so as to obtain a hot welding seam, supplying the inert gas to the hot welding seam so as to envelop it at least partially, and to create a region of the inert gas in contact with the surrounding atmosphere, so that oxidation of the hot welding seam is at least partially suppressed.

1 Claim, 3 Drawing Figures

APPARATUS TO SUPPRESS OXIDATION DURING RESISTANCE WELDING

BACKGROUND OF THE INVENTION

When welding seams in a resistance-roller welding, there are generated temperatures in the clamping region of the welding location between two electrode rollers in excess of 1,000 degree C., so as to ensure a trouble free connection between two portions of sheet metal. This high temperature increases the velocity of oxidation of the surface of the weld seam to such an extent, that a thick oxidation layer results, which adheres only poorly to the sheet metal, is very brittle, and can easily become detached during further processing of the can components, for example when stiffening the can obtained from the can components, or providing it with a rim. A further disadvantage is the fact that any layer of lacquer subsequently supplied to the welding seam may be broken, and therefore loses its function as protection from corrosion.

These problems have been recognized, and it has already been proposed to seal the region of welding, namely the clamping region between the welding rollers, with respect to the surrounding atmosphere as well as possible, and to supply an inert gas into the sealed space (compare German laid-open patent application DE-OS No. 2908574).

In another known arrangement, namely U.S. Pat. No. 3,652,818, it is proposed to provide in a wide region upstream from the electrode rollers a space sealed from the surrounding atmosphere for containing an inert gas, so that no air or oxygen arriving at the welding location can reach any overlapping portions of the sheet metal.

These two known arrangements achieve their objectives, but require relatively expensive sealing means to maintain the inert atmosphere in the above-described regions, so as to avoid an unnecessarily large and uneconomic amount of the expensive inert protecting gas.

The known arrangements have a further disadvantage that they cannot be retrofitted easily to existing machines. Nor are they suitable for machines where the diameter of the can is changed frequently.

SUMMARY OF THE INVENTION

It is therefore one of the principal objects of the invention to devise a method and an apparatus, in which the disadvantages of the prior art are avoided using only simple components, which additionally can easily be retrofitted to existing machines without entailing any significant expense.

This objective is achieved in an apparatus and a method of at least partially suppressing oxidation of can components or the like during resistance-roller welding with the aid of an inert gas, by welding the can components to one another, so as to obtain a hot welding seam, supplying the inert gas to the hot welding seam, so as to envelop it at least partially, and to create a region of the inert gas in contact with the surrounding atmosphere, so that oxidation of the hot welding seam is at least partially suppressed.

It is advantageous if the can components are movable in a predetermined direction, and if the inert gas is agitated, and the agitated inert gas applied to a location downstream of, and near the hot welding seam, as seen along the predetermined direction.

The advantage of the invention can therefore be easily recognized as being the following:

Avoidance of an expensive gas chamber which must be sealed with respect to the surrounding atmosphere;

As no sealing means are provided, there occurs no wear of the sealing means;

No impairments of the cans during transport through the region of the inert gas;

Supply of the inert gas only to a relevant location, and consequently:

Low consumption of the gas;

Easy adjustment at a location downstream of the resistance-welding rollers and in the event of any change of diameter of the can obtained from the welded can components;

Easy retrofit to existing machines, without requiring any substantial changes in the machines;

Purposeful cooling of the welded seam, and consequently:

Low velocity of oxidation.

Further objects and advantages of the invention will be set forth in part in the following specification, and in part will be obvious therefrom, without being specifically referred to, the same being realized and attained as pointed out in the claims hereof.

DESCRIPTION OF THE DRAWING

For a fuller understanding of the nature and objects of the invention, reference should be had to the following detailed description, taken in connection with the accompanying drawings in which.

DESCRIPTION OF THE PREFERRED EMBODIMENTS

Figure 1:
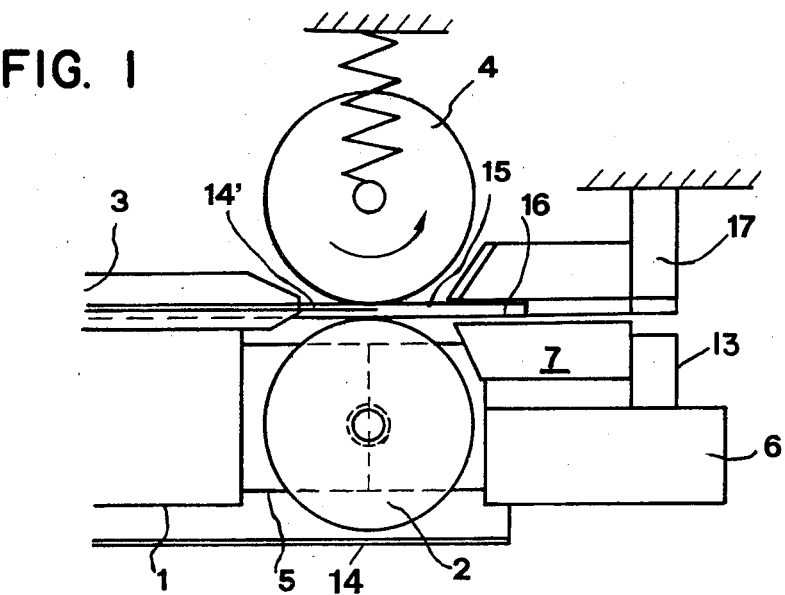
FIG. 1 is a longitudinal section through the apparatus, according to the present invention, and parts of a welding machine bordering thereonto.
Figure 2:
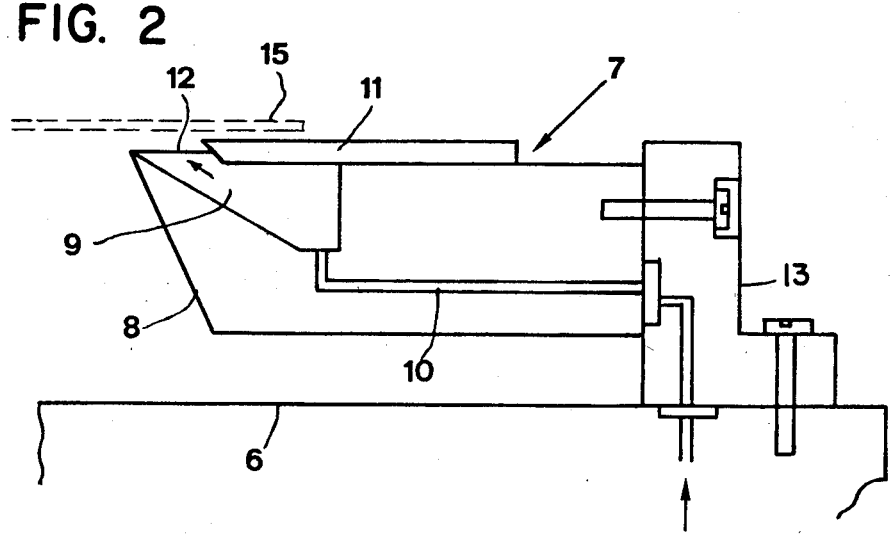
FIG. 2 is an enlarged longitudinal section through the apparatus.

Referring now to the drawings, in FIGS. 1 and 2 there is shown a portion of a welding machine necessary for the understanding of the present invention, particularly an arm or carrier 1, on which is mounted a lower electrode roll 2. Above the arm 1 there is disposed a guiding or Z-rail 3, and a spring-supported upper electrode roll 4 movable vertically. The electrode roll 2 is rotatably supported in a recess 5 of the arm 1. At the end of an arm 6 there is disposed the inventive gas supply 7 for treating the inner side of the weld, which gas-supply 7 is longitudinally adjustable, as well as adjustable in height. The gas supply 7 consist essentially of a housing 8, a centrifugal or expansion chamber 9 including a gas conduit 10, as well as a slider 11 for changing the cross-sectional area of the discharge opening 12. The housing 8 is vertically displaceable by (non-illustrated) means along the holding means 13, and the holding means 13 are again horizontally displaceable along the end of the arm 6.

The still unwelded sheet metal edges of a can body or can components 14 transported in the Z-shaped rail 3 towards the welding rolls 2 and 4 are denoted with a reference numeral 14'. Following passage through the two electrode rolls 2 and 4 there arises between the two sheet metal edges 14 a homogenous connection in the form of a welding seam 15, which has a thickness substantially smaller than that of the sum of the thicknesses of the unwelded sheet metal edges 14'.

From FIG. 1 it can be further ascertained that in order to protect the seaming weld on the external side of the as yet incomplete can 14, a gas supply 16 similar to the gas supply 7 is provided above the gas supply 7. The gas supply 16 is also movable vertically and horizontally along a support 17 which is part of the (non-illustrated) welding apparatus. The interior construction of the gas supply 16 is similar to that of the gas supply 7. The external contour of the gas supplies 7 and 16, which face the can components or as yet incomplete cans 14, matches about that of the as yet incomplete can 14. It is not necessary to reduce the lateral distance of the part-annular space existing between the as yet incomplete can 14, on one hand, and the gas supplies 7 and 16 on the other hand, for the purpose of providing a seal therebetween.

Figure 3:
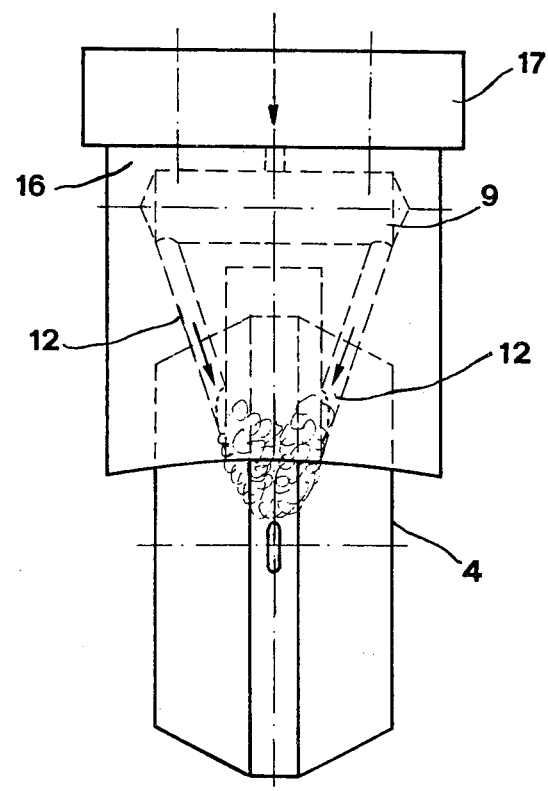
FIG. 3 is a plan view of the apparatus from below.

In an alternate embodiment, shown in FIG. 3, there are provided two openings 12 in the device 16, instead of a single opening, which communicate either with two respective expansion-or centrifugal-chambers 9, or a single chamber 9. It will be understood that an expansion-or centrifugal-chamber 9 can also be provided, which has a totally different cross section and/or volume than those shown in the drawings. The gas supply means 7 and 16 are supplied through conduits in either the arm 2, or the support 17 from a central gas source.

It has been shown in practice that an apparatus and method according to the present invention suppresses an oxidation layer as required in a simple manner. In many cases it is even desirable, that an oxidation layer of small thickness be provided, which temporarily protects the seam from corrosion, and which, as a result of its relatively low thickness, is not punctured or damaged when the complete can is formed. In such cases the rate of gas supply is correspondingly reduced.

Argon, nitrogen, hydrogen or mixtures thereof, or similar such commercial products can be used as an inert gas.

I wish it to be understood that I do not disire to be limited to the exact details of construction shown and described, for obvious modifications will occur to a person skilled in the art.

Having thus described the invention, what we claim as new and desire to be secured by Letters Patent is as follows:

1. In a resistance roller welding machine for seam welding two can components movable in a predetermined direction, including oxidation suppression means operable for at least partially suppressing oxidation of the hot welding seam, the improvement comprising gas supply means forming part of said oxidation suppression means having an opening operative for discharging an agitated inert gas therethrough to a location downstream of and near said welding seam, as seen along said predetermined direction, and an expansion chamber for agitating and cooling said inert gas prior to discharging it through said opening.

* * * * *